Figure 1:
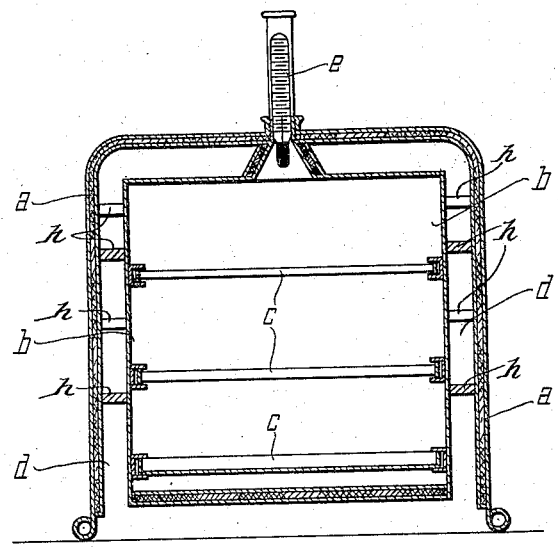

C. LAMPERT.
PORTABLE BOILING, ROASTING, AND BAKING APPARATUS.
APPLICATION FILED OCT. 5, 1911.

1,169,167.

Patented Jan. 25, 1916.

WITNESSES:
G. V. Rasmussen
Louis Alexander

INVENTOR
CARL LAMPERT
BY
Briesen & Smith
ATTORNEYS

THE COLUMBIA PLANOGRAPH CO., WASHINGTON, D. C.

UNITED STATES PATENT OFFICE.

CARL LAMPERT, OF FRANKFORT-ON-THE-MAIN, GERMANY.

PORTABLE BOILING, ROASTING, AND BAKING APPARATUS.

1,169,167.  Specification of Letters Patent.  Patented Jan. 25, 1916.

Application filed October 5, 1911. Serial No. 652,973.

*To all whom it may concern:*

Be it known that I, CARL LAMPERT, a subject of the Emperor of Germany, and a resident of Frankfort-on-the-Main, Germany, have invented certain new and useful improvements in Portable Boiling, Roasting, and Baking Apparatus, of which the following is a specification.

This invention relates to a portable boiling, roasting and baking apparatus for converting raw articles of food, such as meat, fish, poultry, vegetables, fruit, et cetera, into a cooked condition, employing the normal temperatures necessary in each case, and utilizing any suitable existent source of heat which is independent of the actual apparatus.

The articles of food are not directly exposed to radiation but inclosed in a non-permeable parchment paper wrapper or casing, freely located inside a boiling and roasting chamber adapted to be hermetically closed. In this they are merely subjected to the normal temperature necessary for each operation, by indirectly produced hot air radiation. The normal temperatures employed are for boiling 80° R. stewing 90° and roasting 95-100°, and no heating or combustion gases can come into the boiling and roasting chamber and therefore cannot reach the articles of food. Higher temperatures such as have been hitherto employed have only a deleterious action on the preparation of the food both as regards its nutritive value and also its weight, appearance and external form. The effect of too high temperatures is merely to cause a loss of nutritive substances. Roast meat in particular thereby loses very greatly in weight and appearance. The formation of a crust and the scorching of roast meat is merely the consequence of abnormal temperatures. In the systems of roasting hitherto employed by the outside of the roast meat being first cooked and then the inside, the pieces of meat must lose in nutritive substances, weight and appearance, as the hot air which, in all the systems hitherto employed, comes directly in contact with the food must always pass through the parts which are already cooked externally until the pieces are also cooked internally.

In consequence of the circumstance that in this improved apparatus the foods are exposed to the action of hot air in a wrapping of a material, such as parchment paper, which is not a good conductor of heat, they are gradually and uniformly acted on. In this way the piece of meat or other article is only converted into the cooked condition when in all its parts it has reached the temperature necessary for this. The proof that the cooking proceeds thus is that no crust is formed. Further the piece of meat or substance is on the average always uniform in color from the external edge to the core and also full of juice. The use of the parchment paper wrapping with the assistance of the normal temperature yields a perfectly new roasting effect. Fish may also be thoroughly cooked in the same way excluding water and steam if they are exposed inclosed in a parchment paper wrapper to a normal temperature of 80° R. in the boiling and roasting chamber of this improved apparatus. The fish then retains all its albumens, which are lost in the ordinary operation of boiling as hitherto practised.

Figure 2:
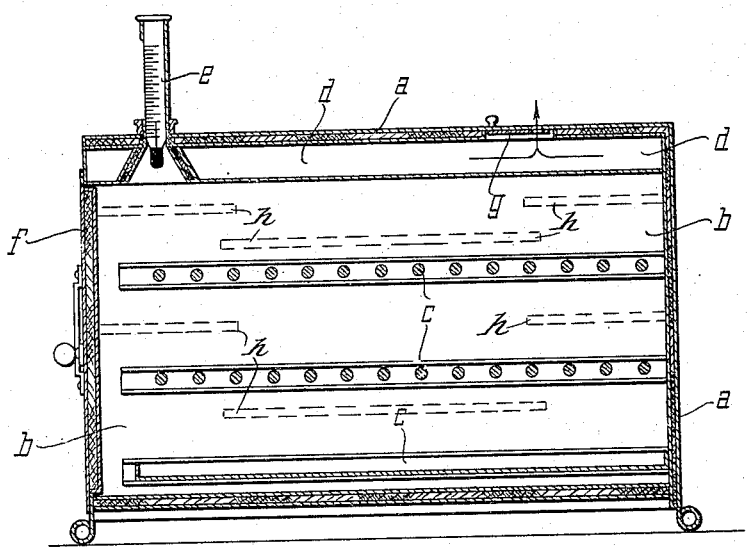

Referring to the accompanying drawings, in which an example of construction of the invention is shown: Figure 1 is a cross section; and Fig. 2, a longitudinal section of the same.

The improved apparatus consists of a suitably made, double-walled metal container *a*, preferably provided with a suitable insulation between said double walls, the inner space of which container, that is to say, the actual boiling and roasting chamber *b*, is hermetically shut off from the heating gases and products of combustion which flow around it. In the interior of this chamber *b*, which is adapted to be hermetically closed, grates and plates *c* are slidably mounted in suitable guides, and serve to support the food products during the cooking or other operation. The boiling and roasting chamber *b* is formed of a simple sheet metal casing, and only its bottom which acts as heat distributer is made with double walls with insulating material between them. The object of this is to prevent a stronger radiation of heat from the bottom into the chamber *b* than from the sides and the cover, which would cause the food products to be unequally acted on. The external container *a* formed of a casing with an intermediate layer of insulating material is open below preferably throughout its entire extent for receiving the hot gases which rise and accumulate in the heating space *d* formed between said container and the boiling and roasting chamber *b*. By this means the said gases impart heat from the outside to the chamber *b*, the walls of which in turn radiate heat toward the inside for heating the inclosed air in said chamber. Outlet passages from the boiling and roasting chamber are not provided.

A thermometer *e* serves for ascertaining the normal temperature necessary in each case in the chamber *b* which temperature is thus under continual observation and may consequently be maintained at any predetermined degree. This thermometer is carried in an insulated manner preferably on a relatively immovable wall of the container *a* and extends into the heating chamber *d*, said thermometer being arranged inside a protective casing in such a way that its scale is visible and legible from the outside. Separate guiding or baffle plates *h* may also be preferably provided in the heating chamber *d* to guide and distribute the hot gases rising therein and retard the same in such a way as to produce a uniform heating of the cooking chamber.

The cooking chamber *b* is accessible from the front through a door *f* adapted to be hermetically closed, and therefore interrupts the heating chamber *d*, but is closely shut off from it, in order to bar access to the heating gases and products of combustion. In order to govern the passage of the same through the heating chamber *d* and to be able to adjust and maintain the necessary temperature in the cooking chamber *b*, a regulating valve *g* of any suitable construction is provided in the container *a*, which valve is preferably constructed in a manner to provide a fine adjustment. Any overheating of the chamber *b* is prevented by its being indirectly heated and also by the provision of the thermometer and regulating valve.

The apparatus described has no source of heat of its own, but is arranged to be used with any suitable existing source of heat, for instance, a kitchen stove with coal fire, gas stove, petroleum stove or the like. It may simply be placed on the stove plate to catch the heat radiating therefrom. Or, after removal of the ring of the stove, it may be placed for some time directly over a fire hole, in order to directly catch the hot gases, and then moved to one side after the desired temperature has been attained. In consequence of the external insulation the temperature is then maintained for hours. No fall of temperature can take place as the heat radiating from the stove plate is constantly acting from below upward to replace the actual heat absorbed for boiling, roasting or baking.

The boiling, roasting or baking is done with the apparatus hereinbefore described in the following manner: The articles of food to be dealt with, immaterially as to their kind, are merely seasoned as usual, without the addition of fat or water, and placed in a clean parchment paper wrapper made free from all chemicals. The wrapper which is merely stuck together by means of wheaten starch and water is then carefully closed by being folded around several times and the corners tucked in beneath. The wrapper with its contents is then placed on a grate of the chamber *b* and the latter is closed. In making soups and the like in pots or pans, they are closed and inserted in the chamber *b*. The hot gases which flow through the heating chamber *d* or which accumulate therein, encounter the outside of the cooking chamber *b* which then gives off the indirect heat to the inside. As soon as the thermometer indicates the normal temperature each time necessary in the chamber *b*, the regulating valve *g* is so adjusted that when the temperature is once attained it is maintained for hours in consequence of the external insulation of the apparatus. The articles of food in question then remain exposed to this temperature as long as is necessary for the operation each time to be carried out. As the chamber *b* has no outlets, odors cannot escape and there is no loss of nutritive substances. In this quite odorless operation, the food even in the smallest quantities is merely cooked in its own juice. As soon as it is finished extracts are formed in the wrapper, in the case of roasts and the like, which are an infallible indication of the cooking being finished. These extracts are then employed for preparing sauces. In this way all the nutritive substances are obtained in the form which is most digestible and suitable for the human organism.

There is no longer any over boiling, burning, drying up, deterioration of appearance, or loss of weight. The boiling and roasting is done entirely without smell and without the use of fat and butter. The nutritive substances are not extracted and do not come in contact with metal.

The conversion of all kinds of food from a raw to a cooked condition may in this way be carried out with a certainty of retaining all the nutritive substances and entirely without odor and without the use of fat or water and with the apparatus hereinbefore described which forms the object of this invention by means of any suitable existing source of heat.

I declare that what I claim is:—

A portable boiling, roasting and baking apparatus adapted to be removably set upon a stove or the like and comprising an insulated container completely open at the bottom and having an apertured end wall and an opening in its top wall, a chamber supported in said container and having one end sealed by an end wall of the container and its other end open and located in said end wall aperture, said chamber having uninsulated side and top walls spaced respectively from the side and top walls of the container to form a heating space between said container and chamber and having no communication with the latter, said chamber being further provided with an insulated bottom arranged to extend over the stove or the like, an insulated closed channel bridging the space between the top walls of the chamber and container and connecting the opening in the top wall of the container with the interior of the chamber, said channel being adapted to receive a temperature indicating device, an insulated door for and fitting into the open end of said chamber whereby the latter is sealed against the atmosphere and baffle plates located in the heating space between the side walls of the container and chamber for retarding the upward travel of the hot gases.

CARL LAMPERT.

Witnesses:
JEAN GRUND,
CARL GRUND.

Copies of this patent may be obtained for five cents each, by addressing the "Commissioner of Patents, Washington, D. C."